United States Patent
Kamiya (10) Patent No.: US 10,519,968 B2
(45) Date of Patent: Dec. 31, 2019

(54) MOTOR FOR SUPPRESSING ENTRY OF FOREIGN MATTER

(71) Applicant: FANUC CORPORATION, Yamanashi (JP)

(72) Inventor: Yohei Kamiya, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/127,312

(22) Filed: Sep. 11, 2018

(65) Prior Publication Data

US 2019/0078577 A1  Mar. 14, 2019

(30) Foreign Application Priority Data

Sep. 13, 2017 (JP) .................. 2017-176121

(51) Int. Cl.
| | |
|---|---|
| F16J 15/34 | (2006.01) |
| F16J 15/56 | (2006.01) |
| F04D 29/12 | (2006.01) |
| F16H 57/04 | (2010.01) |
| F16J 15/54 | (2006.01) |
| H02K 5/124 | (2006.01) |
| F16J 15/3208 | (2016.01) |

(52) U.S. Cl.
CPC ....... *F04D 29/126* (2013.01); *F16H 57/0454* (2013.01); *F16J 15/3464* (2013.01); *F16J 15/54* (2013.01); *H02K 5/124* (2013.01); *F16J 15/3208* (2013.01)

(58) Field of Classification Search
CPC .... F04D 9/08; F04D 9/10; F04D 29/12; F16J 15/16; F16J 15/3464; F16J 15/43; F16J 15/54
See application file for complete search history.

(56) References Cited

U.S. PATENT DOCUMENTS

| | | | | |
|---|---|---|---|---|
| 2002/0047242 | A1* | 4/2002 | Watanabe | F16J 15/006 277/553 |
| 2005/0001384 | A1* | 1/2005 | Reinhard | F16J 15/004 277/549 |
| 2013/0302160 | A1* | 11/2013 | Manninen | F04D 29/10 415/230 |

FOREIGN PATENT DOCUMENTS

| | | |
|---|---|---|
| JP | 755012 A | 3/1995 |
| JP | 8308211 A | 11/1996 |
| JP | 928053 A | 1/1997 |
| JP | 10127001 A | 5/1998 |
| JP | 200436798 A | 2/2004 |

(Continued)

OTHER PUBLICATIONS

English Abstract and Machine Translation for Japanese Publication No. JPH10-127001 A, published May 15, 1998, 13 pgs.

(Continued)

*Primary Examiner* — Vishal A Patel (74) *Attorney, Agent, or Firm* — Fredrikson & Byron, P.A.

(57) ABSTRACT

A motor includes a facing member having a part facing a rotary shaft, a seal member having elasticity, and an annular member supporting the seal member. Magnets are disposed on the outer circumferential surface of the rotary shaft. Coil units are disposed on the inner circumferential surface of the annular member. The annular member is rotated by a magnetic force in the same direction as the rotary shaft when the rotary shaft rotates. The seal member rotates with the annular member at a rotation speed that is lower than a rotation speed of the rotary shaft.

3 Claims, 6 Drawing Sheets

(56) References Cited

FOREIGN PATENT DOCUMENTS

JP 201396568 A 5/2013

OTHER PUBLICATIONS

English Abstract and Machine Translation for Japanese Publication No. JPH08-308211 A, published Nov. 22, 1996, 20 pgs.
English Abstract and Machine Translation for Japanese Publication No. 2013-096568 A, published May 20, 2013, 13 pgs.
English Abstract and Machine Translation for Japanese Publication No. 2004-036798 A, published Feb. 5, 2004, 16 pgs.
English Abstract and Machine Translation for Japanese Publication No. 09-028053 A, published Jan. 28, 1997, 9 pgs.
English Abstract and Machine Translation for Japanese Publication No. 07-055012 A, published Mar. 3, 1995, 8 pgs.

* cited by examiner

MOTOR FOR SUPPRESSING ENTRY OF FOREIGN MATTER

BACKGROUND OF THE INVENTION

1. Field of the Invention

The present invention relates to a motor for suppressing the entry of a foreign matter.

2. Description of the Related Art

Some motors are used in environments where foreign matters are scattered. For example, the spindle head of a machine tool is arranged in a machining chamber for machining workpieces. The spindle head is used in an environment where foreign matters such as chips and cutting fluid are scattered during cutting. The spindle head includes a motor that rotates a spindle. The entry of the foreign matter into the motor may cause a failure of the insulation on windings or a deterioration of the function of a bearing.

The motor includes a rotor having a rotary shaft connected to another member and a housing surrounding the rotor. The rotary shaft rotates around the rotation axis. Since the rotary shaft cannot be fixed to the housing, the motor preferably has a mechanism for suppressing the entry of the foreign matter between the housing and the rotary shaft.

Conventionally, structures for suppressing the entry of the foreign matter between the rotary shaft and the housing have been examined. In the related art, the provision of an oil seal between the rotary shaft and the housing is known (for example, Japanese Unexamined Patent Publication No. 2004-36798A). The oil seal is fixed to the housing and is formed such that a lip part on the end part of the oil seal slides on the outer circumferential surface of the rotary shaft.

Moreover, a motor having a sealing structure is known. The structure has the function of the oil seal when the rotary shaft rotates at low speed, whereas the structure has the function of a labyrinth seal when the rotary shaft rotates at high speed (for example, Japanese Unexamined Patent Publication No. 7-55012A and Japanese Unexamined Patent Publication No. 9-28053A).

In addition to the oil seal and the labyrinth seal, a mechanical seal is known as a structure for suppressing a liquid flow to the outside from the inside of a casing (for example, Japanese Unexamined Patent Publication No. 2013-96568A).

SUMMARY OF THE INVENTION

The provision of an oil seal between a housing and a rotary shaft can suppress the entry of the foreign matter between the housing and the rotary shaft. However, the oil seal always comes in contact with the rotary shaft during the period in which the rotary shaft rotates. Thus, for example, when the rotary shaft rotates at a high speed exceeding 8000 rpm, heat may be generated by friction of a part that comes in contact with the rotary shaft. Alternatively, the part that comes in contact with the rotary shaft may be worn out. As a result, a sealing performance may be deteriorated or the oil seal may deteriorate over time.

The oil seal may be replaced with a labyrinth seal that is formed so as to suppress air flow by a small clearance between members. Although the air passage is narrow in the labyrinth seal, the presence of the air passages may deteriorate the sealing performance. In particular, when the rotary shaft rotates at low speed or the rotary shaft is stopped, the sealing performance may be deteriorated.

A motor according to an aspect of the present disclosure includes a rotor provided with a rotary shaft and a housing supporting the rotary shaft. The motor includes a facing member that is fixed to the housing and includes a part facing the rotary shaft. The motor includes a seal member that has elasticity and is formed in an annular shape and an annular member that supports the seal member. The seal member is configured such that an inner end part in the radial direction comes in contact with the rotary shaft and an outer end part in the radial direction comes in contact with the facing member. The annular member is formed so as to rotate about the same rotation axis as the rotary shaft. First magnetism generating members that generate magnetism are arranged on the outer circumferential surface of the rotary shaft. Second magnetism generating members that generate magnetism are arranged on the inner circumferential surface of the annular member so as to face the first magnetism generating members. The first magnetism generating members and the second magnetism generating members are formed such that the annular member is rotated by magnetic force in the same direction as the rotary shaft when the rotary shaft rotates. The seal member rotates with the annular member at a rotation speed that is lower than a rotation speed of the rotary shaft.

DETAILED DESCRIPTION

Referring to FIGS. 1 to 7, a motor according to an embodiment will be described below. The motor according to the present embodiment is used in an environment where foreign matters are scattered. The motor according to the present embodiment is arranged in a machine tool where a workpiece is machined by moving a tool relative to the workpiece. The machine tool includes a spindle head that rotates a spindle to which the tool is attached. The motor of the present embodiment is disposed on the spindle head.

The spindle head is arranged in the machining chamber of the machine tool. Foreign matters such as chips produced during the cutting of a workpiece and droplets of cutting fluid sprayed into the machining chamber are present around the spindle head. The motor according to the present embodiment has a structure for suppressing the entry of such foreign matters into the motor.

Figure 1:
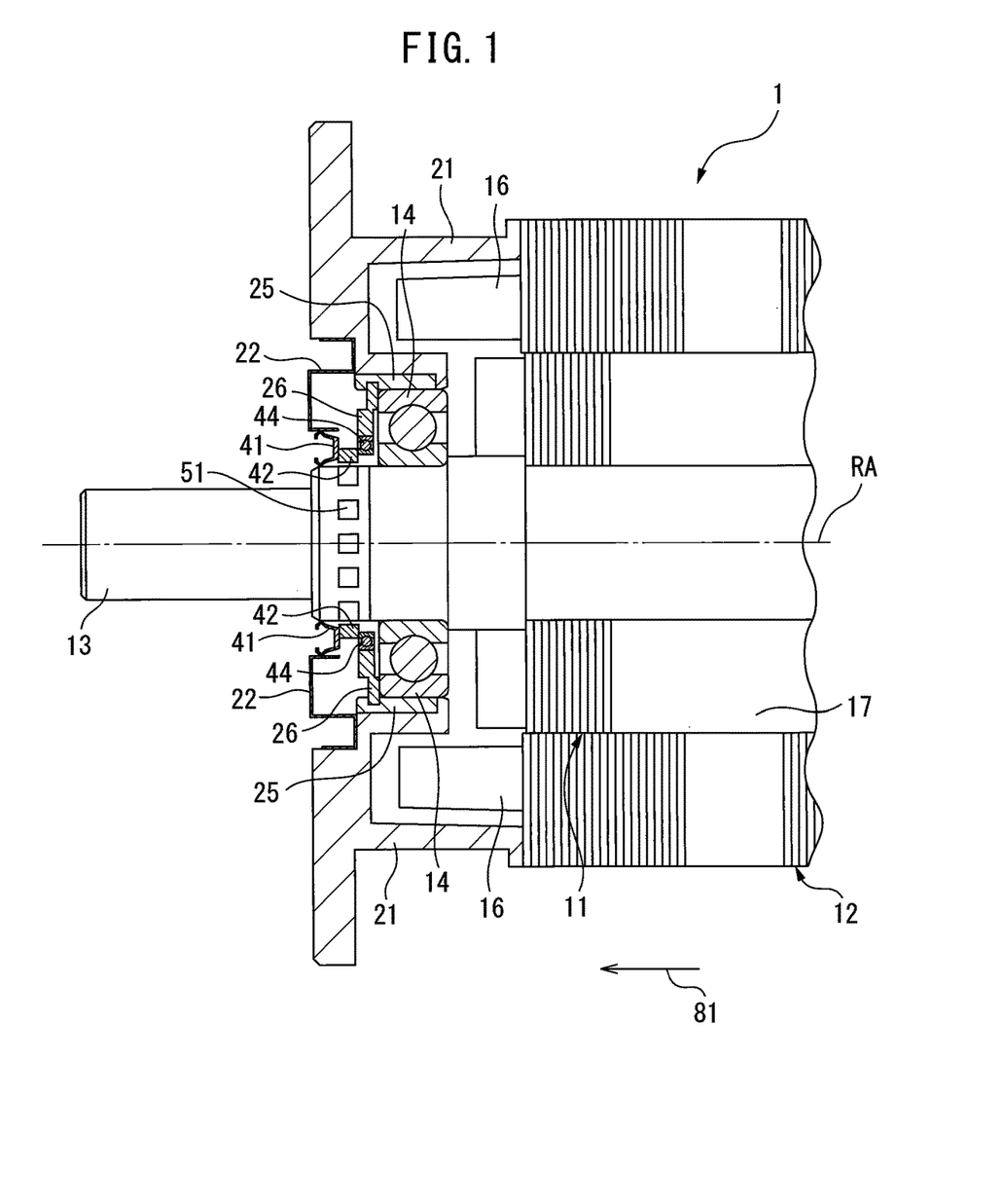
FIG. 1 is a cross-sectional view showing one end part of a motor according to an embodiment.
Figure 2:
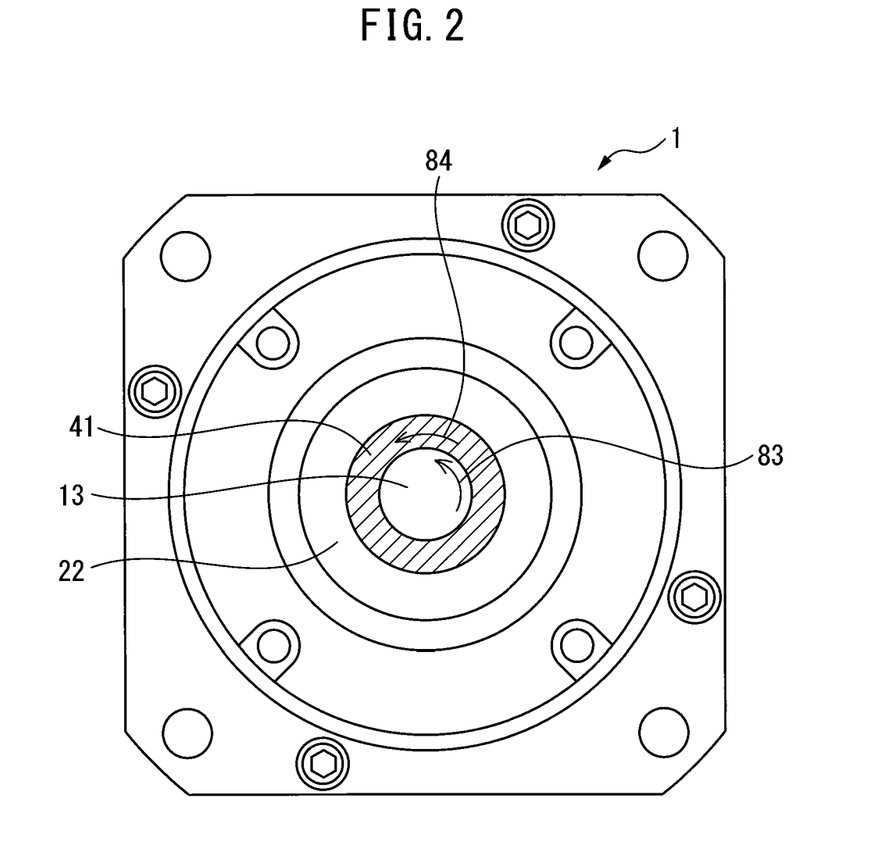
FIG. 2 is a schematic front view showing the motor according to the embodiment.

FIG. 1 is a schematic cross-sectional view showing one end part of the motor according to the present embodiment. FIG. 2 is a schematic front view showing the end part of the motor according to the present embodiment. FIGS. 1 and 2 show the end where another member is connected to a rotary shaft. In FIG. 2, a seal member 41 is diagonally shaded. A motor 1 includes a rotor 11 and a stator 12. The stator 12 includes, for example, a stator core formed by a plurality of magnetic steel sheets stacked in the axial direction, and a coil 16. The rotor 11 includes a rotary shaft 13 and a rotor core 17 that is fixed to the outer side of the rotary shaft 13 and has a plurality of magnets. The rotary shaft 13 is connected to another member, e.g., a spindle for transmitting rotation force.

The rotary shaft 13 rotates about a rotation axis RA. The axial direction of the present embodiment is a direction along which the rotation axis RA of the rotary shaft 13 extends. The radial direction of the present embodiment is the radial direction of a circle centered at the rotation axis RA. The circumferential direction of the present embodiment is the circumferential direction of the circle centered at the rotation axis RA. In the motor 1, the side on which the rotary shaft 13 is connected to another member will be referred to as the front side. The side opposite the front side will be referred to as the rear side. In the example of FIG. 1, arrow 81 indicates the front side of the motor 1.

The motor 1 includes a housing 21 disposed at the front side. The housing 21 is cylindrically formed so as to surround the rotor 11. The stator 12 is fixed to the housing 21. The housing 21 includes a support member 25 that supports a first bearing 14. The housing 21 rotatably supports the rotor 11 via the bearing 14. The bearing 14 rotatably supports the front end part of the rotary shaft 13.

Figure 3:
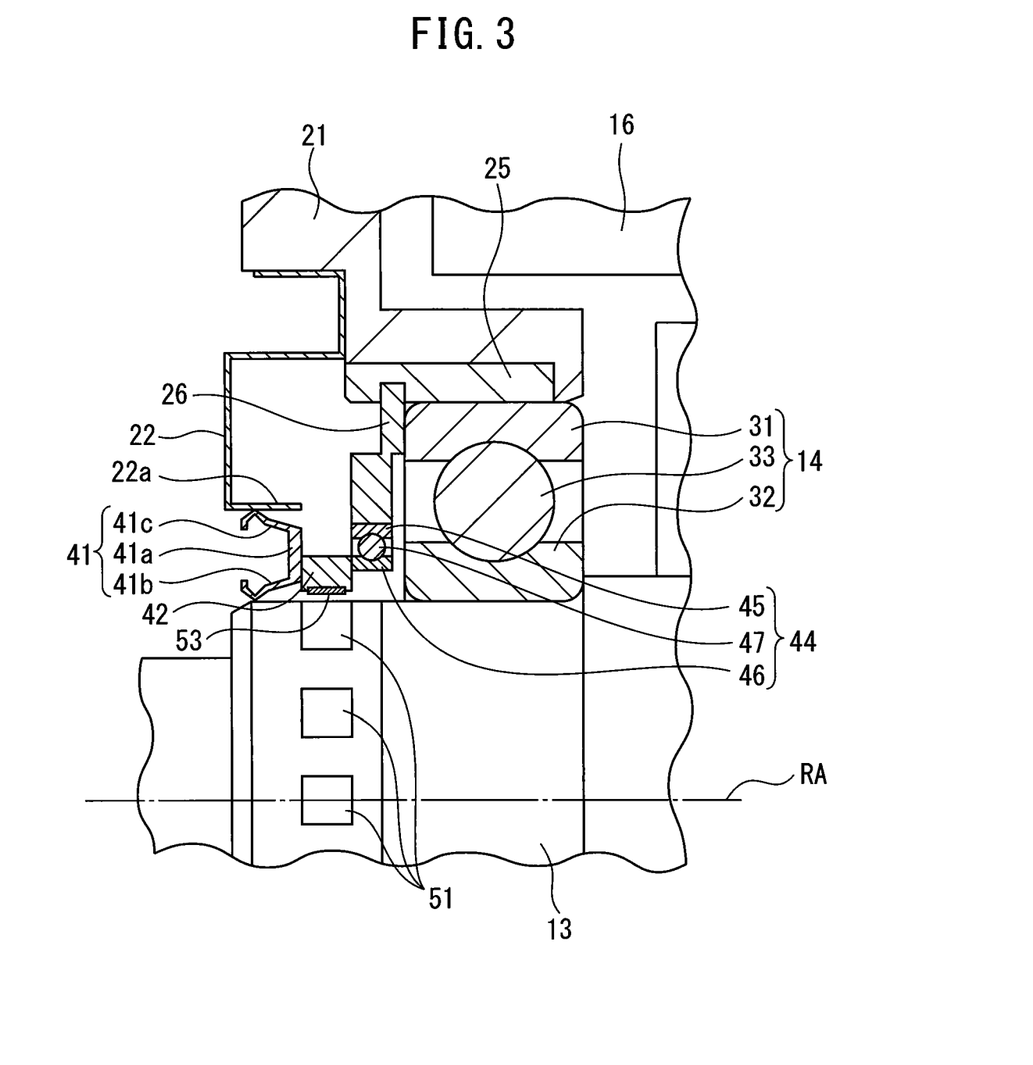
FIG. 3 is an enlarged cross-sectional view showing the part of a seal member in the motor according to the embodiment.

FIG. 3 is an enlarged cross-sectional view showing a part at which the seal member is disposed. The first bearing 14 is a bearing for rotating the rotary shaft 13. The first bearing 14 includes an outer ring 31, an inner ring 32, and balls 33 disposed between the outer ring 31 and the inner ring 32. The inner ring 32 rotates with the rotary shaft 13. The support member 25 of the housing 21 supports the outer ring 31 of the bearing 14.

The motor 1 of the present embodiment includes a facing member 22 having a part facing the rotary shaft 13. The facing member 22 of the present embodiment is fixed to the housing 21. The facing member 22 is shaped like a plate. Moreover, the facing member 22 is annularly formed so as to surround the rotary shaft 13. The facing member 22 of the present embodiment is fixed to the housing 21 with adhesive. However, the facing member is not limited thereto and may be fixed to the housing with a fastening member, e.g., a bolt.

The facing member 22 includes a facing portion 22a as a portion facing the outer circumferential surface of the rotary shaft 13. The facing portion 22a has a planar shape. The facing portion 22a is formed so as to extend in parallel with the outer circumferential surface of the rotary shaft 13. In other words, a clearance between the outer circumferential surface of the rotary shaft 13 and the inner circumferential surface of the facing portion 22a is constant in the circumferential direction.

The facing member of the present embodiment is shaped like a plate. However, the facing member is not limited thereto and may be formed into any shape having a part facing the rotary shaft. Moreover, the facing portion of the facing member may have elasticity in a direction that presses the seal member.

Figure 4:
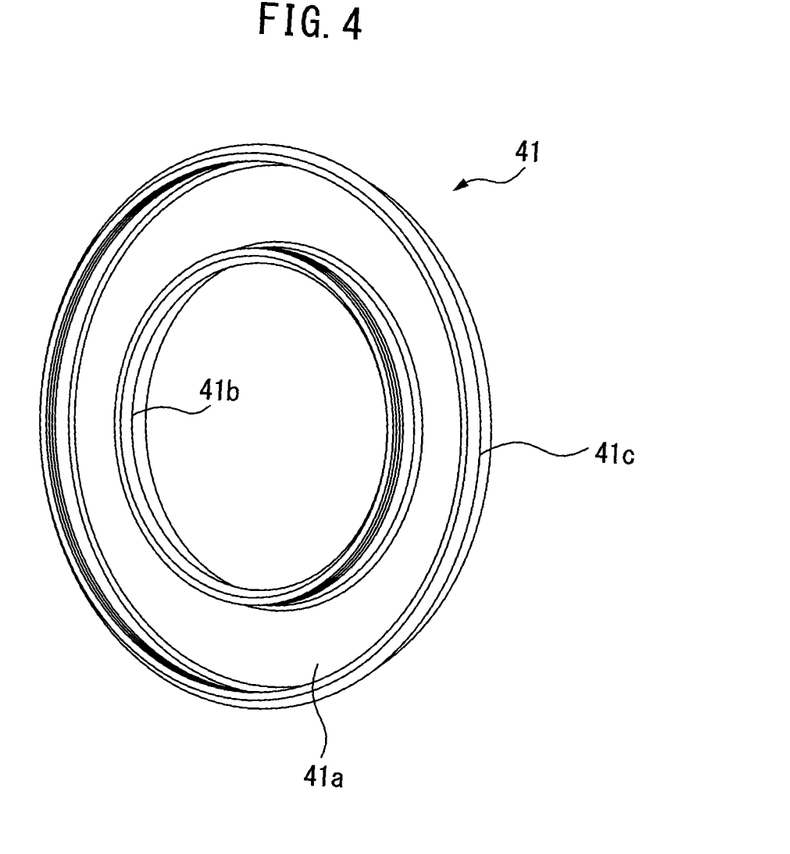
FIG. 4 is a perspective view showing the seal member according to the embodiment.

FIG. 4 is a perspective view showing the seal member according to the present embodiment. Referring to FIGS. 2 to 4, the seal member 41 is disposed serving as an oil seal in an area interposed between the facing member 22 and the rotary shaft 13. The seal member 41 is formed by an elastic member. Moreover, the seal member 41 is formed in an annular shape. The seal member 41 includes a base portion 41a, an inner lip portion 41b that extends from the base portion 41a to the outer circumferential surface of the rotary shaft 13, and an outer lip portion 41c that extends from the base portion 41a to the facing portion 22a. The inner lip portion 41b slides on the outer circumferential surface of the rotary shaft 13. The outer lip portion 41c slides on the surface of the facing portion 22a of the facing member 22.

The inner lip portion 41b and the outer lip portion 41c are elastic so as to be radially deformed. The inner lip portion 41b and the outer lip portion 41c can be made of, for example, a rubber such as nitrile rubber or fluororubber. The inner lip portion 41b is pressed to the rotary shaft 13 by an elastic force. The outer lip portion 41c is pressed to the facing portion 22a of the facing member 22 by an elastic force.

The seal member can have any configuration including the inner lip portion and the outer lip portion. For example, a metallic ring for keeping the shape of the base portion 41a may be disposed in the base portion 41a of the seal member 41. Alternatively, the inner lip portion 41b and the outer lip portion 41c may include springs that press the lip portions to a member to be brought into contact with the lip portions.

The seal member 41 of the present embodiment is formed so as to rotate coaxially with the rotation axis RA of the rotary shaft 13. The motor 1 includes a second bearing 44 serving as a bearing for rotating the seal member 41. The second bearing 44 is arranged coaxially with the first bearing 14. The bearing 44 includes an outer ring 45, an inner ring 46, and balls 47 disposed between the outer ring 45 and the inner ring 46. The outer ring 45 of the bearing 44 is fixed to a support member 26. The support member 26 is fixed to the support member 25. The bearing 44 is supported by the housing 21 via the support member 26.

The motor 1 includes an annular member 42 fixed to the second bearing 44. The annular member 42 is fixed to the inner ring 46 of the bearing 44. The annular member 42 is formed so as to rotate about the same rotation axis RA as the rotary shaft 13. The base portion 41a of the seal member 41 is fixed to the annular member 42. The seal member 41 rotates integrally with the annular member 42 and the inner ring 46 of the bearing 44.

The motor 1 of the present embodiment includes a drive mechanism that rotates the seal member 41 about the rotation axis RA. The drive mechanism includes first magnetism generating members disposed on the outer circumferential surface of the rotary shaft 13. The first magnetism generating members are formed so as to generate magnetism. Furthermore, the drive mechanism includes second magnetism generating members disposed on the inner circumferential surface of the annular member 42. The second magnetism generating members are formed so as to generate magnetism. The second magnetism generating members are disposed so as to face the first magnetism generating members.

The drive mechanism of the present embodiment rotates the seal member 41 by magnetic force. The drive mechanism rotates the annular member 42 in the same direction as the rotary shaft 13. The drive mechanism is formed so as to rotate the annular member 42 at a rotation speed that is lower than a rotation speed of the rotary shaft 13.

The first magnetism generating members of the first embodiment include a plurality of magnets 51 disposed on the outer circumferential surface of the rotary shaft 13. The magnets 51 of the present embodiment are permanent magnets. A plurality of the magnets 51 are arranged apart from each other in the circumferential direction. The plurality of magnets 51 are disposed at equal intervals. In the present embodiment, magnets 51 oriented with the S poles directed outward and magnets 51 oriented with the N poles directed outward are alternately arranged along the circumferential direction. In other words, the plurality of the magnets 51 are disposed so that the magnetic poles of the magnets adjacent to each other are different.

Figure 5:
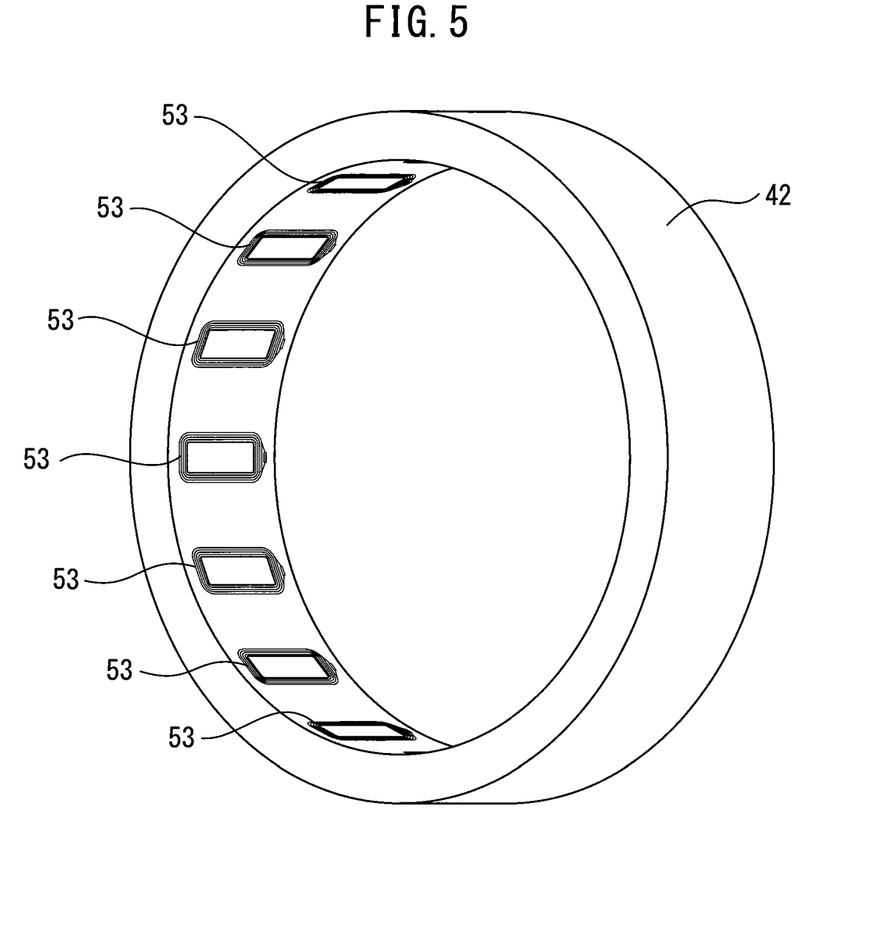
FIG. 5 is a schematic perspective view of an annular member.

FIG. 5 is a schematic perspective view showing the annular member according to the present embodiment. Referring to FIGS. 3 and 5, the annular member 42 is shaped like a ring so as to surround the rotary shaft 13. The second magnetism generating members include a plurality of coil units 53 disposed on the inner circumferential surface of the annular member 42. The plurality of the coil units 53 are arranged apart from each other in the circumferential direction. The coil units 53 are disposed at equal intervals along the inner circumferential surface of the annular member 42. The coil units 53 are arranged so as to oppose the magnets 51 disposed on the rotary shaft 13.

Figure 6:
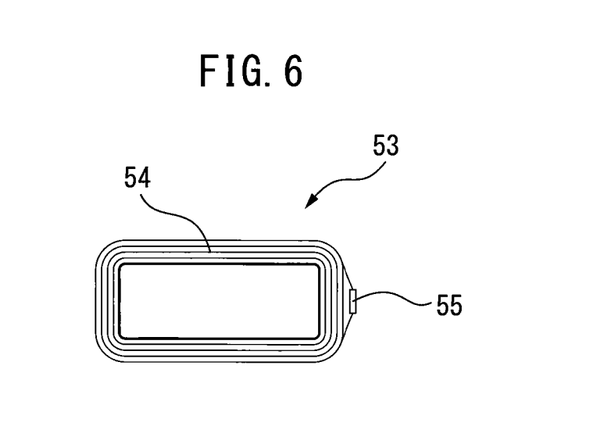
FIG. 6 is a schematic plan view showing a coil unit disposed on the inner surface of the annular member.

FIG. 6 is a schematic front view showing the coil unit according to the present embodiment. The coil unit 53 includes a coil 54 in which a conductive wire is wound and a resistance element 55 connected to the conductive wire. The coil unit 53 of the present embodiment is formed so that the coil 54 is rectangular in a plan view. The resistance element 55 is connected to one end and the other end of the conductive wire of the coil 54.

The current value supplied to the coil 54 is determined according to the resistance value of the resistance element 55. The resistance element 55 has the function of adjusting the current passing through the conductive wire of the coil 54. The coil unit 53 is not limited to this configuration. Any configuration can be used as long as the coil can generate the magnetism.

The seal member 41 of the present embodiment is rotated by the effect of the magnetic force when the rotary shaft 13 is rotated by the drive mechanism. Referring to FIGS. 2 and 3, the rotary shaft 13 rotates in the direction indicated by arrow 83. The magnets 51 rotate with the rotary shaft 13. The magnetic flux produced by the magnets 51 crosses the coil units 53 opposed to the magnets 51. An induced current passes through the coils 54 of the coil units 53. Then, the magnetism is generated from the coil units 53 by the induced current. The magnetism generated by the magnets 51 and the magnetism generated by the coil units 53 act to apply a magnetic force to the coil unit 53. The magnetic force is applied in the movement direction of the magnets 51. Thus, the annular member 42 rotates in the same direction as the rotary shaft 13. As indicated by arrow 84, the seal member 41 fixed to the annular member 42 rotates with the annular member 42.

The rotation of the seal member 41 causes the inner lip portion 41b to slide on the outer circumferential surface of the rotary shaft 13. The outer lip portion 41c is caused to slide on the facing portion 22a. In this way, the seal member 41 rotates in contact with the outer circumferential surface of the rotary shaft 13 and the facing portion 22a of the facing member 22, thereby continuously sealing the inside of the housing 21. In other words, the seal member 41 can form a sealing structure around the rotary shaft 13. This can suppress the entry of the foreign matter between the housing 21 and the rotary shaft 13 into the motor 1.

The drive mechanism is formed so that the rotation speed (angular speed) of the seal member 41 is lower than the rotation speed (angular speed) of the rotary shaft 13. The rotation speed of the seal member 41 can be adjusted by changing the resistance elements 55 of the coil units 53. The current value supplied to the coil 54 can be reduced by selecting a resistance element 55 having a large resistance value. Moreover, the magnetic flux density generated in the coil unit 53 can be reduced. This can reduce the rotation speed of the seal member 41.

The rotation speed of the seal member 41 can be increased by selecting a resistance element 55 having a small resistance value. In other words, as the resistance value of the resistance element 55 decreases, the rotation speed of the seal member 41 can be brought closer to that of the rotary shaft 13. In this way, since the coil unit 53 includes the resistance element 55, the resistance element 55 having a proper resistance value can be selected so as to rotate the seal member 41 at a desired rotation speed.

Figure 7:
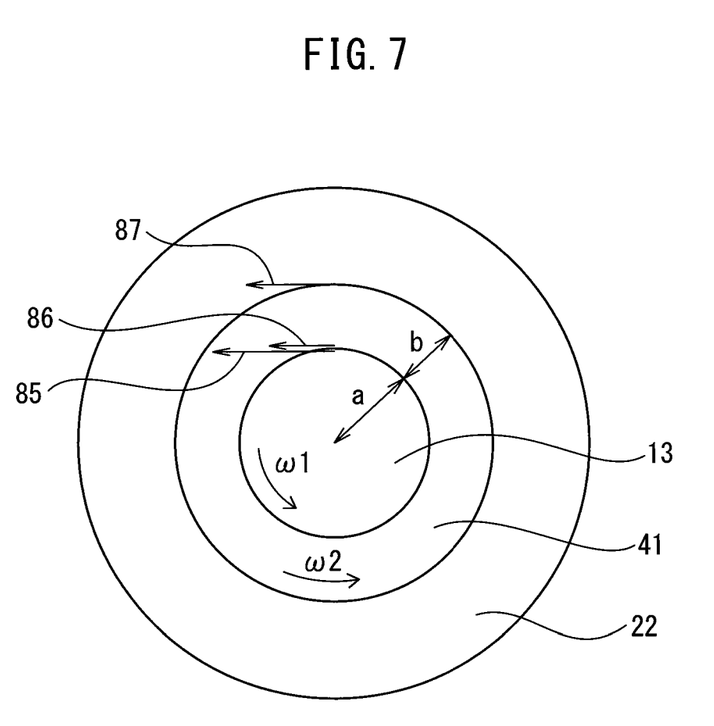
FIG. 7 is an enlarged plan view for explaining the surface speeds of the rotary shaft and the seal member.

The rotation speed of the seal member will be specifically described below. FIG. 7 is an enlarged front view schematically showing the rotary shaft, the seal member, and the facing member according to the present embodiment. In this example, the rotation speed of the rotary shaft 13 is denoted as an angular speed $\omega 1$. Moreover, the rotation speed of the seal member 41 is denoted as an angular speed $\omega 2$. The angular speed $\omega 1$ is higher than the angular speed $\omega 2$ ($\omega 1 > \omega 2$). The rotary shaft 13 has a radius a. The seal member 41 has a width b in the radial direction. The width b corresponds to the clearance between the facing member 22 and the rotary shaft 13.

Referring to FIGS. 3 and 7, the rotary shaft 13 rotating at the angular speed $\omega 1$ has a circumferential speed $a\omega 1$ on the outer circumferential surface. The speed $a\omega 1$ is indicated by arrow 85. Furthermore, the contact portion of the inner lip portion 41b of the seal member 41 has a circumferential speed $a\omega 2$. The speed $a\omega 2$ is indicated by arrow 86.

The structure of an oil seal according to the related art has a stationary seal member. Thus, the relative speed of the rotary shaft with respect to the lip portion of the seal member in the circumferential direction is speed $a\omega 1$. In contrast, in the structure of the present embodiment, the relative speed of the rotary shaft 13 with respect to the inner lip portion 41b in the circumferential direction is $a(\omega 1-\omega 2)$. The relative speed of the rotary shaft 13 with respect to the inner lip portion 41b according to the present embodiment is lower than the relative speed of the lip portion of the oil seal according to the related art. In other words, the motor 1 of the present embodiment can reduce the relative speed in the sliding part of the oil seal and the rotary shaft. Thus, in the oil seal, heat generation and wear in the part sliding with the rotary shaft can be suppressed.

Furthermore, the contact portion of the outer lip portion 41c of the seal member 41 has a circumferential speed of $(a+b)\omega 2$. The speed $(a+b)\omega 2$ is indicated by arrow 87. Since the facing member 22 is stationary, the circumferential speed is equal to the relative speed of the outer lip portion 41c with respect to the facing portion 22 in the circumferential direction. This speed $(a+b)\omega 2$ is preferably smaller than the circumferential speed $a\omega 1$ on the outer circumferential surface of the rotary shaft. By adopting this configuration, the relative speed of the outer lip portion according to the present embodiment can be lower than the relative speed of the lip portion of the oil seal according to the related art. Heat generation and wear on the outer lip portion of the seal member can be suppressed.

The resistance value of the resistance element 55 of the coil unit 53 is preferably selected so as to satisfy the foregoing conditions. Specifically, the motor is preferably formed such that the rotation speed of the seal member is lower than the rotation speed of the rotary shaft and the circumferential speed of the outer lip portion is lower than the circumferential speed of the surface of the rotary shaft.

Furthermore, the magnetic flux density of the magnets 51 disposed on the rotary shaft 13, the number of magnets 51, the distance between the magnets 51, the size of the coil 54, the shape of the coil 54, the number of turns of the coil 54, the distance between the coil units 53, and etc. are preferably selected so as to satisfy the foregoing conditions.

As described above, in the motor 1 of the present embodiment, the relative speed of the inner lip portion 41b and the outer lip portion 41c of the seal member 41 can be lower than that of the lip portion of the oil seal according to the related art. Thus, heat generation and wear on the lip portion of the seal member can be suppressed. The motor of the present embodiment can maintain the reliability of the seal member over an extended period.

In a high-speed rotation of the rotary shaft, in particular, the seal member is likely to generate heat and cause deterioration. Hence, the sealing structure of the present embodiment is suitable for a motor in which the rotary shaft rotates at high speed. Motors for high-speed rotations may include, for example, a motor with the rotary shaft 13 rotating at 8000 rpm or higher.

The spindle motor for rotating the spindle of the machine tool rotates at high speed. Moreover, the spindle head including the spindle motor is disposed in a machining chamber where foreign matters are scattered. The spindle head requires a structure for preventing the entry of foreign matters into the motor. Hence, the motor having the sealing structure of the present invention is suitable for the spindle motor in the machine tool.

Furthermore, the upper limit value of the number of revolution of the motor depends upon the material of the seal member. The upper limit value of the number of revolution is determined for each seal member. Moreover, the upper limit value of the number of revolution also depends upon the diameter of the rotary shaft of the motor. Since the motor of the present embodiment can suppress heat generation and wear of the seal member, the rotary shaft can be rotated at a higher number of revolution than the upper limit value of the number of revolution of the motor according to the related art.

In the motor of the present embodiment, the seal member is rotated by an electromagnetic force generated using the induced current of the coil. The drive mechanism using a magnetic force is not limited to this configuration. Any configuration may be used with a magnetic force. The first magnetism generating members of the present embodiment are the plurality of permanent magnets and the second magnetism generating members are the plurality of coil units, but the embodiment is not limited to this. The first magnetism generating members and the second magnetism generating members may be any members that generate the magnetism so as to rotate the annular member. For example, a plurality of permanent magnets oriented with the N poles directed outward can be disposed as the first magnetism generating members on the outer circumferential surface of the rotary shaft and a plurality of permanent magnets oriented with the S poles directed inward can be disposed as the second magnetism generating members on the inner circumferential surface of the annular member. This configuration can also rotate the seal member along with the rotation of the rotary shaft. Moreover, at least one of the rotary shaft and the annular member may include electromagnets serving as magnetism generating members.

The coil unit 53 of the present embodiment includes the resistance element 55 connected to the conductive wire of the coil 54, but the embodiment is not limited to this. The coil unit may not include the resistance element, and a conductive wire having a resistance may be used as the conductive wire that constitutes the coil.

The resistance element 55 in the coil unit 53 of the present embodiment does not change the resistance value, but the embodiment is not limited to this. A variable resister that can change a resistance value can be employed as the resistance element. The rotation speed of the seal member can be adjusted by changing the resistance value of the variable resistor. For example, in the assembling process of the motor, the resistance value of the variable resistor can be adjusted so as to rotate the seal member at a rotation speed set in a design.

Alternatively, the resistance element may be a variable resistor that can change resistance value in response to an external signal. This configuration can easily adjust the rotation speed of the seal member even after the motor is assembled. The resistance value can be reduced when the sealing member is rotated at high speed. For example, the rotation speeds of the tool and the spindle motor are set according to the machining contents of a workpiece. Furthermore, the rotation speed of the seal member can be adjusted according to the rotation speed of the spindle motor.

The motor of the present embodiment is a motor that rotates the spindle of the machine tool, but the embodiment is not limited to this. The present invention can be applied to any motor placed in an environment where the foreign matter is liable to enter into the motor.

According to an aspect of the present disclosure, a motor can be provided with an oil seal that effectively suppresses the entry of the foreign matter when the rotary shaft rotates at high speed.

The foregoing embodiment can be optionally combined with another. In the respective drawings, the same or equivalent parts are indicated by the same reference numerals. The foregoing embodiment is merely exemplary and does not limit the invention. Further, in the embodiments, changes in the embodiments shown in the claims are included.

The invention claimed is:

1. A motor comprising:
a rotor including a rotary shaft;
a housing supporting the rotary shaft;
a facing member that is fixed to the housing and includes a part facing the rotary shaft;
a first bearing that is formed so as to support an end part of the rotary shaft and is supported by the housing;
a second bearing that is supported by the housing and is arranged coaxially with the first bearing;
a seal member that has elasticity and is formed in an annular shape; and
an annular member supporting the seal member, wherein
the seal member has an inner end part and an outer end part, wherein the inner end part in a radial direction comes in contact with the rotary shaft and the outer end part in the radial direction comes in contact with the facing member,
the annular member is formed so as to rotate about the same rotation axis as the rotary shaft,
the annular member is fixed to an inner ring of the second bearing,
the inner ring of the second bearing, the annular member, and the seal member are integrally rotated,
first magnetism generating members that generate magnetism are arranged on an outer circumferential surface of the rotary shaft,
second magnetism generating members that generate magnetism are arranged on an inner circumferential surface of the annular member so as to face the first magnetism generating members, the first magnetism generating members and the second magnetism generating members are formed such that the annular member is rotated by magnetic force in the same direction as the rotary shaft when the rotary shaft rotates, and the seal member rotates with the annular member at a rotation speed that is lower than a rotation speed of the rotary shaft.

2. The motor according to claim 1, wherein the first magnetism generating members are a plurality of permanent magnets that are arranged apart from each other in a circumferential direction, and the second magnetism generating members are a plurality of coil units that are arranged apart from each other in the circumferential direction so as to face the permanent magnets.

3. The motor according to claim 2, wherein the coil unit includes a coil in which a conductive wire is wound and a resistance element connected to the conductive wire.

* * * * *